United States Patent
Miller et al.

(10) Patent No.: US 11,196,285 B2
(45) Date of Patent: Dec. 7, 2021

(54) OPERATING A REDUNDANT POWER SUPPLY REGULATOR USING A TRANSITION CONTROL SIGNAL

(71) Applicant: International Business Machines Corporation, Armonk, NY (US)

(72) Inventors: Michael L. Miller, Rochester, MN (US); Patrick K. Egan, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 146 days.

(21) Appl. No.: 16/683,738

(22) Filed: Nov. 14, 2019

(65) Prior Publication Data

US 2021/0152014 A1 May 20, 2021

(51) Int. Cl.
*H02J 9/00* (2006.01)
*H02J 9/06* (2006.01)
*G06F 1/3296* (2019.01)

(52) U.S. Cl.
CPC ............ *H02J 9/005* (2013.01); *G06F 1/3296* (2013.01); *H02J 9/061* (2013.01)

(58) Field of Classification Search
None
See application file for complete search history.

(56) References Cited

U.S. PATENT DOCUMENTS

| | | | |
|---|---|---|---|
| 5,654,859 A | * | 8/1997 | Shi ............................ H02J 1/10 361/100 |
| 6,301,133 B1 | * | 10/2001 | Cuadra .................... H02J 1/102 363/65 |
| 6,836,100 B2 | | 12/2004 | Egan et al. |
| 6,930,869 B1 | | 8/2005 | Zansky et al. |
| 7,453,169 B2 | | 11/2008 | Grundmann et al. |
| 8,212,401 B2 | | 7/2012 | Linkhart et al. |
| 8,943,338 B2 | | 1/2015 | Jau et al. |
| 9,869,727 B2 | | 1/2018 | Schweigert |
| 10,141,778 B2 | | 11/2018 | Huang et al. |
| 2004/0227495 A1 | | 11/2004 | Egan et al. |
| 2008/0088294 A1 | * | 4/2008 | Sikora ....................... H02J 1/10 323/318 |
| 2015/0311780 A1 | * | 10/2015 | Tomas .................. H02H 7/1225 363/50 |

FOREIGN PATENT DOCUMENTS

TW    I460965 B    11/2014

* cited by examiner

*Primary Examiner* — Jared Fureman
*Assistant Examiner* — Aqeel H Bukhari
(74) *Attorney, Agent, or Firm* — Nathan M. Rau

(57) ABSTRACT

Operating a redundant power supply regulator using a transition control signal including supplying an operating voltage through an ORing in the redundant power supply regulator, wherein the ORing is connected to a comparator configured to turn off the ORing in response to detecting a fault; receiving the transition control signal indicating that the redundant power supply regulator is transitioning to a reduced voltage, wherein the reduced voltage is less than the operating voltage; receiving the reduced voltage by the ORing; and supplying the reduced voltage through the ORing by using the transition control signal to prevent the comparator from turning off the ORing.

20 Claims, 4 Drawing Sheets

OPERATING A REDUNDANT POWER SUPPLY REGULATOR USING A TRANSITION CONTROL SIGNAL

BACKGROUND

Field of the Invention

The field of the invention is power supplies, or, more specifically, methods and systems for operating a redundant power supply regulator using a transition control signal.

Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

SUMMARY

Methods and systems for operating a redundant power supply regulator using a transition control signal. Operating a redundant power supply regulator using a transition control signal includes supplying an operating voltage through an ORing in the redundant power supply regulator, wherein the ORing is connected to a comparator configured to turn off the ORing in response to detecting a fault; receiving the transition control signal indicating that the redundant power supply regulator is transitioning to a reduced voltage, wherein the reduced voltage is less than the operating voltage; receiving the reduced voltage by the ORing; and supplying the reduced voltage through the ORing by using the transition control signal to prevent the comparator from turning off the ORing.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
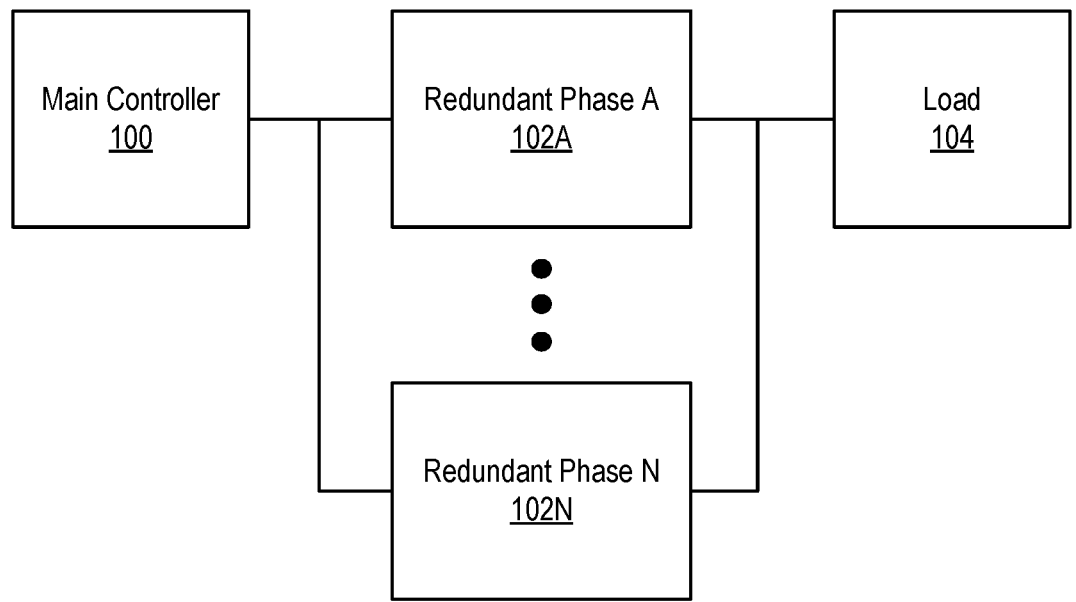
FIG. 1 sets forth a block diagram of an example redundant power supply regulator according to embodiments of the present invention.

FIG. 1 shows an exemplary redundant power supply regulator according to embodiments of the present invention. As shown in FIG. 1, the exemplary redundant power supply regulator includes a main controller (100), multiple redundant phases (redundant phase A (102A), redundant phase N (102N)), and a load (104).

The main controller (100) is a device that controls each of the redundant phases (redundant phase A (102A), redundant phase N (102N)). The main controller (100) also supplies the voltage to each redundant phase (redundant phase A (102A), redundant phase N (102N)) that is in turn supplied to the load (104). The main controller (100) may also provide the transition control signal to the redundant phases (redundant phase A (102A), redundant phase N (102N)) via the transition control signal line.

The redundant phases (redundant phase A (102A), redundant phase N (102N)) channel power from the main controller (100) to the load (104) and provide safeguards against faults. The redundant phases (redundant phase A (102A), redundant phase N (102N)) utilize an ORing to turn off the redundant phase in the event of a reverse current or negative reverse current beyond a particular threshold.

The load (104) is the consumer of power in the system. The load (104) may be a computing circuit that includes a processor, memory, and other computing elements. Such loads may operate at a variety of power states. For example, while processing resource-intensive workloads, the load (104) may require a higher frequency and core voltage. Conversely, during a period of inactivity, such as a sleep mode, the load (104) may operate using a lower frequency and core voltage. Normal operation may utilize a frequency and core voltage between the two highest and lowest modes of operation.

Loads such as processors enter sleep mode by lowering frequency first, possibly stopping some clocks, then lowering the core voltage. Due to the nature of this state, the processor load current is very small under these conditions. Some amount of reverse current, or a negative reverse current threshold, is beneficial to allow fault detection and to keep the bus voltage constant. However, while some negative current is desirable, there is a limit because this sinking current adds to the actual load in fall conditions.

Redundant regulators typically have a larger amount of output capacitance when compared to non-redundant applications. Larger output capacitance increases the required discharge current for a given voltage transition rate. One aspect of the ORing protection without a comparator and transition control signal is that the ORing field-effect transistor (FET) may turn off during the high-to-low voltage transition when the regulator attempts to discharge the output capacitance while maintaining the very small load current. Once the ORing device is off, the regulator can no longer sink current to discharge the output capacitance.

Figure 2:
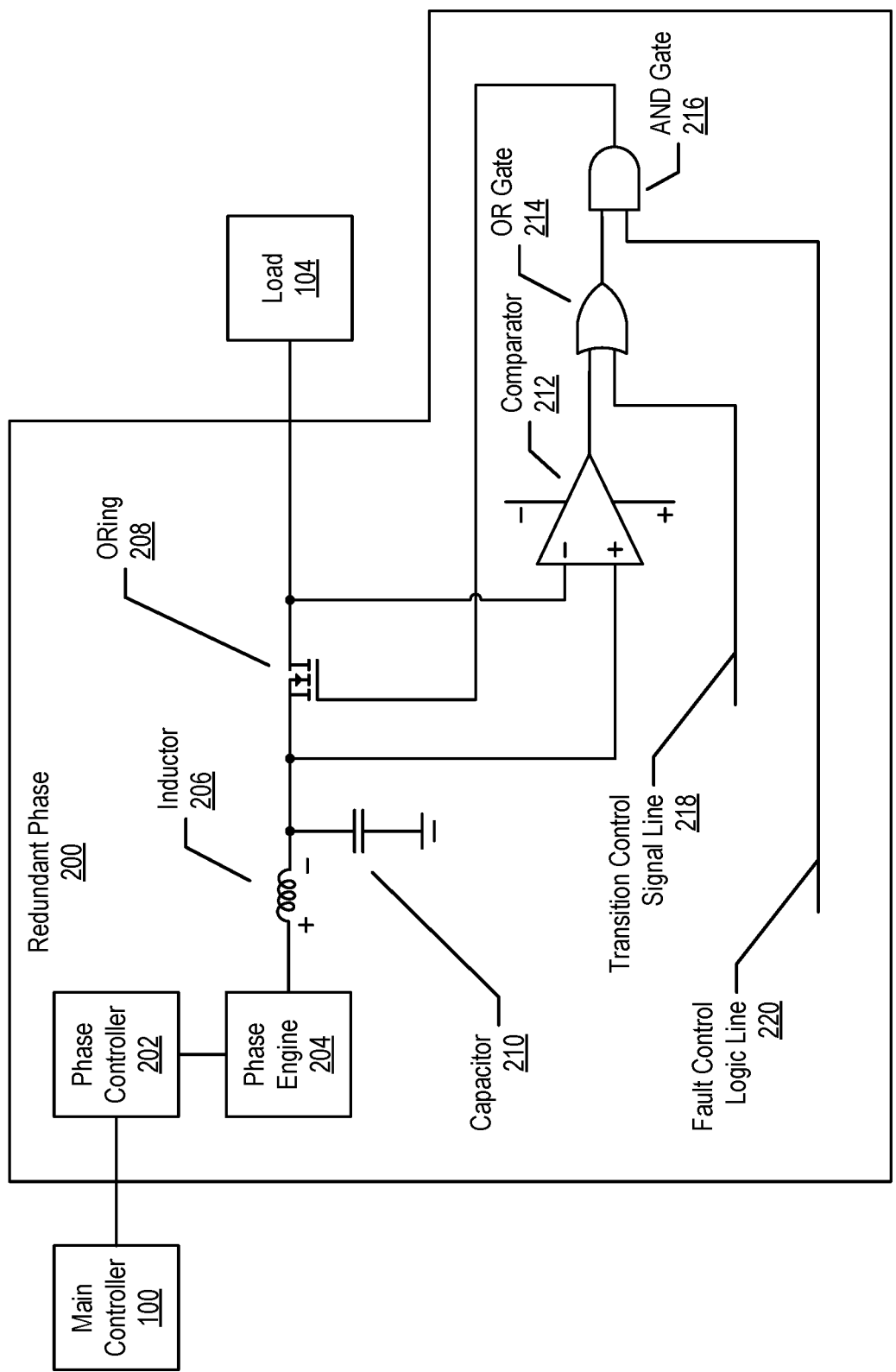
FIG. 2 sets forth a block diagram of an example redundant phase for a redundant power supply regulator according to embodiments of the present invention.
Figure 3:
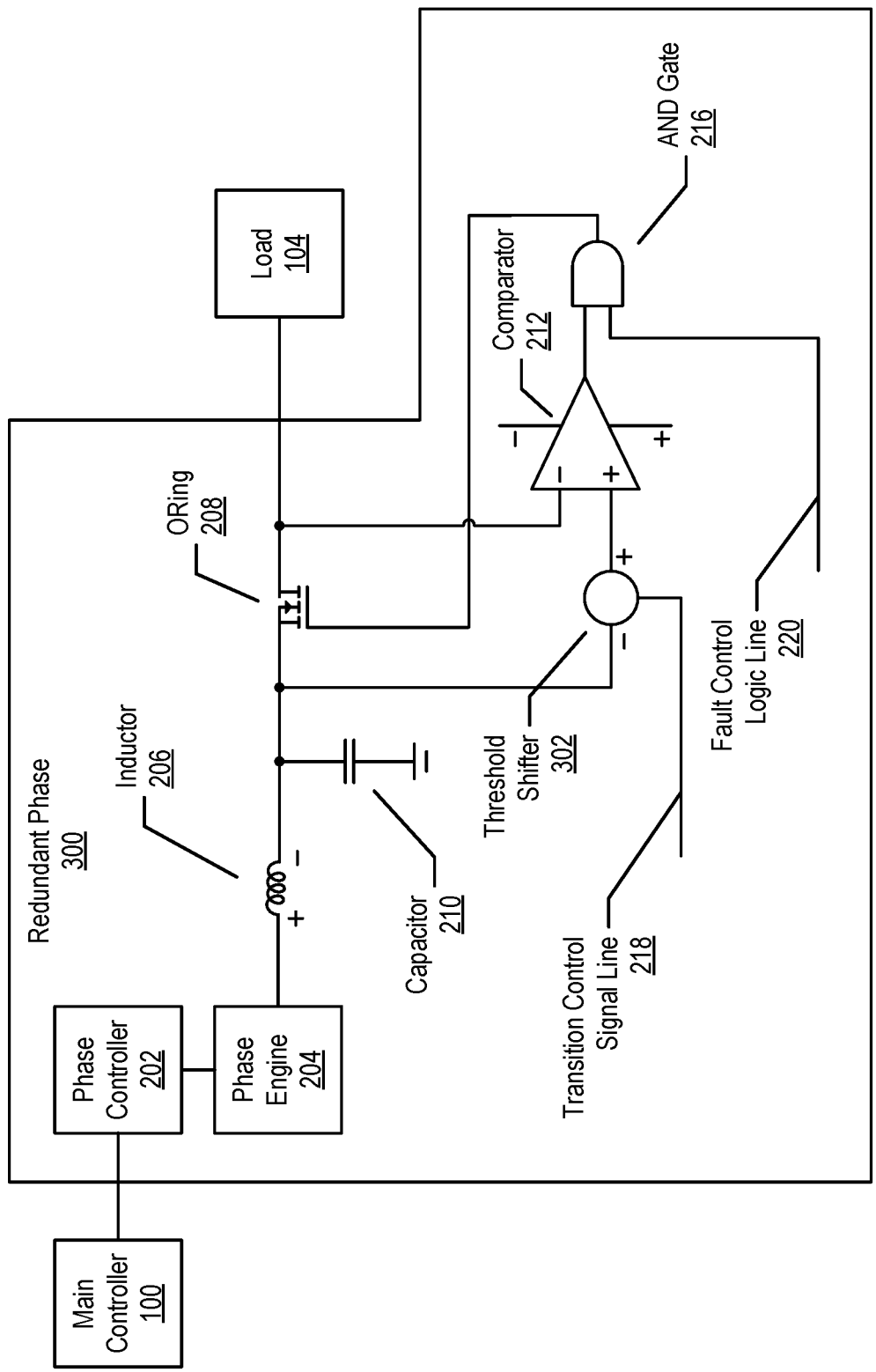
FIG. 3 sets forth a block diagram of an example redundant phase for a redundant power supply regulator according to embodiments of the present invention.

FIG. 2 and FIG. 3 describe a system to keep an ORing device on during a transition to a reduced power state. This is achieved by either forcing the device on for a period of time during the transition (FIG. 2) or by shifting the reverse current threshold to a more negative threshold and allow increased discharge current during the transition (FIG. 3).

Without the systems described in FIG. 2 and FIG. 3, an over voltage condition may occur when the ORing device opens and the regulator is not able to discharge the output capacitance. The systems described in FIG. 2 and FIG. 3 address this condition by forcing the output capacitance voltage to track the digital-to-analog reference in the main controller.

FIG. 2 shows an exemplary redundant phase according to embodiments of the present invention. As shown in FIG. 2, the exemplary redundant phase (200) includes a phase controller (202), a phase engine (204), an inductor (206), an ORing (208), a capacitor (210), a comparator (212), an OR gate (214), an AND gate (216), a transition control signal line (218), and a fault control logic line (220). The exemplary redundant phase (200) shown in FIG. 2 is an example of one embodiment of a redundant phase (redundant phase A (102A), redundant phase N (102N)) shown in FIG. 1.

The phase controller (202) controls the isolation of the redundant phase (200) during a fault. The phase engine (204) forms a regulator structure for the redundant phase (200). The phase engine (204) receives a pulse-width modulation signal from the main controller (100) and then converts the input voltage to an output voltage by controlling FETs with the phase engine (204) using a driver module. The inductor (206) and capacitor (210) operate as a filter for the power regulation.

The ORing (208) is a device that, in conjunction with the comparator (212), prevents current flow during a detected fault. The ORing (208) may be a field-effect transistor (FET), a bipolar switch, or any other suitable device. The comparator (212) is a device that compares the voltages across two terminals of the ORing (208) and outputs a high signal or low signal depending upon which voltage is greater. For example, if a reverse current occurs across the ORing (208) (i.e., from the load (104) toward the main controller (100)), then the comparator (212) will detect that the voltage on the load side of the ORing (208) is greater than the voltage on the opposite side of the ORing (208) and output a negative or low signal. If the ORing (208) control were connected directly to the output of the comparator (212), the negative or low signal output from the comparator (212) would shut off the ORing (208).

The transition control signal line (218) carries the transition control signal from the main controller (100) or the phase controller (202) to the OR gate (214) (or the threshold shifter as shown in FIG. 3). The transition control signal indicates that the redundant phase (200) is transitioning to a reduced voltage (i.e., from a high voltage to a low voltage). The transition control signal may be generated in response to the main controller (100) and/or the phase controller (202) receiving an instruction to reduce the voltage provided to the load (104) (e.g., as part of a transition into a sleep mode). The instruction may originate with the load itself (e.g., by an operating system executing on the computing circuitry).

The transition control signal line (218), in combination with the comparator (212) and the ORing (208), provides a mechanism that forces the ORing (208) on during high-to-low voltage transitions. Further, logic gates, such as the OR gate (214) and the AND gate (216), maintain redundancy protections during the output voltage transitions. As shown in the example of FIG. 2, the output of the comparator is connected to one input of an OR gate (214) and the transition control signal line (218) is connected to the other input of the OR gate (214). Even if the comparator (212) detects a reverse current or negative reverse current and outputs a negative or low signal, if the transition control signal is present, the output of the OR gate (214) will remain positive or high.

The transition control signal may include a delay allowing the redundant phase (200) of the redundant power supply regulator to return to normal operation (i.e., a positive current flow from the main controller (100) toward the load (104)). Specifically, the transition control signal may remain activated to continue to force the ORing (208) on for a period of time after the transition from a high voltage to a low voltage has completed. This may be done in order to prevent the ORing (208) from shutting off before normal operation resumes.

The fault control logic line (220) carries a fault control logic signal that indicates whether a fault has been detected on elsewhere on the system. The fault control logic line (220) may be operated by the phase controller (202). As shown in the example of FIG. 2, the fault control logic line (220) may be connected to an input of the AND gate (216) with the other input of the AND gate (216) connected to the output of the OR gate (214) (operated, in part, by the comparator (212)).

The combination of the AND gate (216) and fault control logic line (220) operate as a bypass to shut off the ORing (208) in the event of a fault detected elsewhere in the system. For example, if an error is detected by the phase controller (202) during the transition from high-to-low, the phase controller (202) would send a negative or low signal on the fault control logic line (220), causing the AND gate (216) to send a negative or low signal to close the ORing (208) despite the positive or high signal being output from the comparator (212).

FIG. 3 shows an exemplary redundant phase according to embodiments of the present invention. As shown in FIG. 3, the exemplary redundant phase (300) includes a phase controller (202), a phase engine (204), an inductor (206), an ORing (208), a capacitor (210), a comparator (212), an AND gate (216), a transition control signal line (218), a fault control logic line (220), and a threshold shifter (302). The exemplary redundant phase (300) shown in FIG. 3 is an example of one embodiment of a redundant phase (redundant phase A (102A), redundant phase N (102N)) shown in FIG. 1.

The redundant phase (300) of FIG. 3 includes elements similar to those in the redundant phase (200) of FIG. 2. However, in the example of FIG. 3, a threshold shifter (302) is placed between one terminal of the ORing (208) and an input of the comparator (212). Additionally, the redundant phase (300) of FIG. 3 does not include an OR gate.

As shown in the example of FIG. 3, the transition control signal line (218) is connected to an input of the comparator (212) via the threshold shifter (302). In response to receiving the transition control signal, the threshold shifter (302) adjusts the threshold of the comparator (212) to maintain a positive or high signal on the output of the comparator (212). The adjustment may be a value that is inversely proportional to a load current present prior to receiving the reduced voltage. In other words, in response to receiving the transition control signal, the threshold shifter (302) may adjust the threshold of the comparator (212) to a value that is inversely proportional to the load current present at the beginning of the transition.

Figure 4:
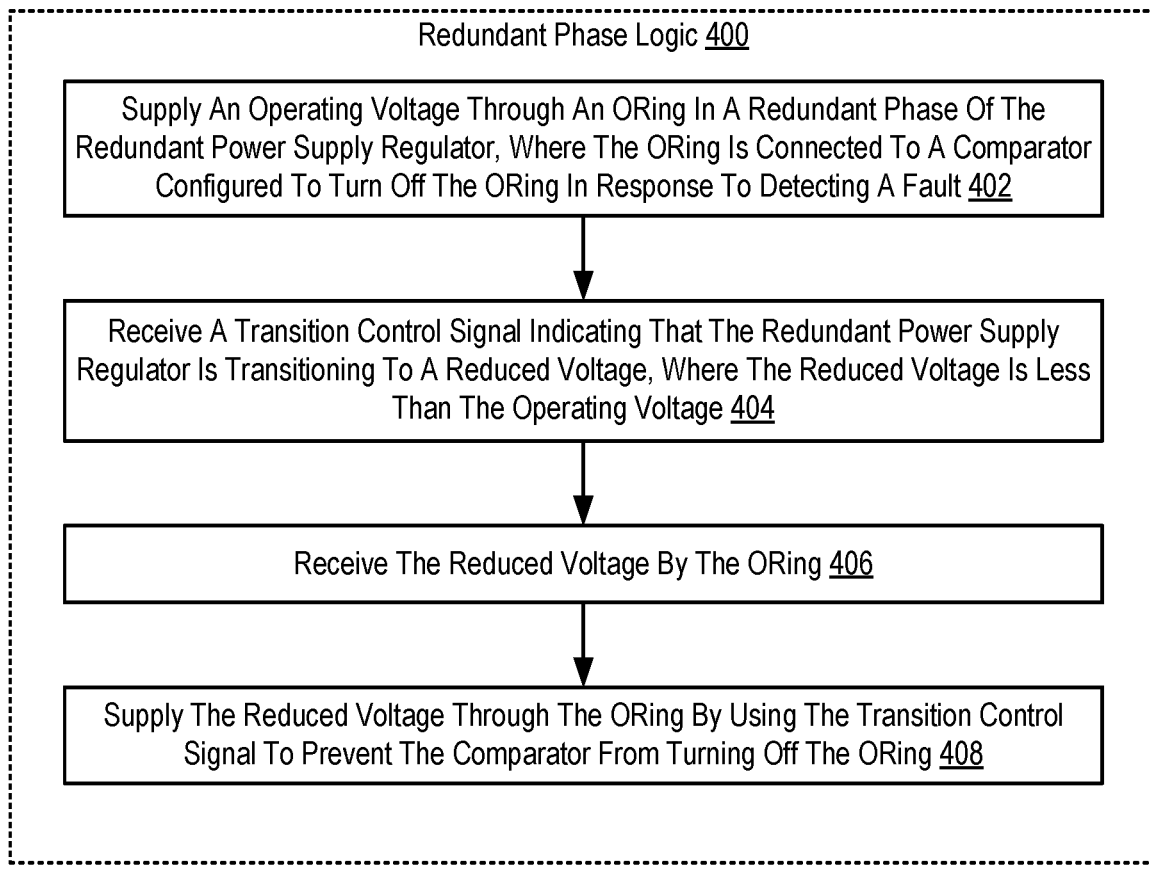
FIG. 4 sets forth a flow chart illustrating an exemplary method for operating a redundant power supply regulator using a transition control signal according to embodiments of the present invention.

For further explanation, FIG. 4 sets forth a flow chart illustrating an exemplary method for operating a redundant power supply regulator using a transition control signal according to embodiments of the present invention that includes supplying (402) an operating voltage through an ORing in the redundant power supply regulator, wherein the ORing is connected to a comparator configured to turn off the ORing in response to detecting a fault. Supplying (402) an operating voltage through the ORing in the redundant power supply regulator, wherein the ORing is connected to a comparator configured to turn off the ORing in response to detecting a fault may be carried out by the redundant phase logic (400) operating under normal conditions in which current flows from the main controller toward the load.

The method of FIG. 4 further includes receiving (404) a transition control signal indicating that the redundant power supply regulator is transitioning to a reduced voltage, wherein the reduced voltage is less than the operating voltage. Receiving (404) a transition control signal indicating that the redundant power supply regulator is transitioning to a reduced voltage, wherein the reduced voltage is less than the operating voltage may be carried out by the main controller or the phase controller generating the transition control signal on the transition control signal line. The transition control signal may be sent to a logic gate (as in FIG. 2) or a threshold shifter (as in FIG. 3).

The method of FIG. 4 further includes receiving (406) the reduced voltage by the ORing. Receiving (406) the reduced voltage by the ORing may be carried out by the ORing detecting a reverse current or negative reverse current across the terminals of the ORing (assuming that a current from the main controller toward the load is a positive current). If the ORing is a FET, the reverse current or negative reverse current may be detected from the drain toward the source of the FET.

The method of FIG. 4 further includes supplying (408) the reduced voltage through the ORing by using the transition control signal to prevent the comparator from turning off the ORing. Supplying (408) the reduced voltage through the ORing by using the transition control signal to prevent the comparator from turning off the ORing may be carried out by using the transition control signal with a logic gate to maintain a positive signal to the ORing control (as in FIG. 2). Alternatively, the transition control signal may be used to adjust the threshold of the comparator using a threshold shifter (as in FIG. 3). Using the transition control signal to prevent the comparator from turning off the ORing may also include allowing the discharge of an output capacitance independent of load conditions. Specifically, by forcing the ORing to remain active, the output capacitance is allowed to discharge regardless of the load conditions.

With systems described above, very fast transitions can be achieved without sacrificing performance, cost, or size of the power devices. Such systems may be useful in a variety of contexts the require fast output voltage transitions, such as solar or wind power generation systems.

In view of the explanations set forth above, readers will recognize that the benefits of operating a redundant power supply regulator using a transition control signal according to embodiments of the present invention include:
Improving the operation of a power supply system by using a transition control signal to prevent a comparator from turning off an ORing in a redundant phase of a redundant power supply regulator, reducing the latency of high-to-low voltage transitions.
Improving the operation of a power supply system by increasing the speed of high-to-low voltage transitions without sacrificing performance, cost, or size of the power devices increasing reliability and robustness of the power supply regulator.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of operating a redundant power supply regulator using a transition control signal, the method comprising:
supplying an operating voltage through an ORing in the redundant power supply regulator, wherein the ORing is connected to a comparator configured to turn off the ORing in response to detecting a fault;
receiving the transition control signal indicating that the redundant power supply regulator is transitioning to a reduced voltage, wherein the reduced voltage is less than the operating voltage;
receiving the reduced voltage by the ORing; and
supplying the reduced voltage through the ORing by using the transition control signal to prevent the comparator from turning off the ORing, wherein the ORing is based on an output of an AND gate.

2. The method of claim 1, wherein the transition control signal is received via a transition control signal line connected to an input of the comparator.

3. The method of claim 2, wherein the transition control signal adjusts the input of the comparator to a value that is inversely proportional to a load current present prior to receiving the reduced voltage.

4. The method of claim 1, wherein an output of the comparator is connected to a first input of an OR gate used to control the ORing, and wherein the transition control signal is received via a transition control signal line connected to a second input of the OR gate.

5. The method of claim 1, wherein the ORing is controlled by an output of an AND gate, wherein a first input of the AND gate is connected to a fault control logic line, and wherein a second input of the AND gate is operated by an output of the comparator.

6. The method of claim 5, wherein the fault control logic line is operated by a phase controller.

7. The method of claim 1, wherein using the transition control signal to prevent the comparator from turning off the ORing comprises allowing discharge of an output capacitance independent of load conditions.

8. The method of claim 1, wherein the transition control signal includes a delay allowing the redundant power supply regulator to return to normal operation.

9. The method of claim 1, wherein the transition control signal is received from one selected from a group consisting of a main controller and a phase controller.

10. The method of claim 1, wherein the ORing is one selected from a group consisting of a field-effect transistor and a bipolar switch.

11. A redundant power supply regulator using a transition control signal comprising:
an ORing configured to supply an operating voltage in the redundant power supply regulator;
a comparator configured to turn off the ORing in response to detecting a fault; and
a transition control signal line providing the transition control signal that indicates that the redundant power supply regulator is transitioning to a reduced voltage, wherein the reduced voltage is less than the operating voltage,
wherein the redundant power supply regulator is configured to supply the reduced voltage through the ORing by using the transition control signal to prevent the comparator from turning off the ORing, wherein the ORing is based on an output of an AND gate.

12. The redundant power supply regulator of claim 11, wherein the transition control signal is received via a transition control signal line connected to an input of the comparator.

13. The redundant power supply regulator of claim 12, wherein the transition control signal adjusts the input of the comparator to a value that is inversely proportional to a load current present prior to receiving the reduced voltage.

14. The redundant power supply regulator of claim 11, wherein an output of the comparator is connected to a first input of an OR gate used to control the ORing, and wherein the transition control signal is received via a transition control signal line connected to a second input of the OR gate.

15. The redundant power supply regulator of claim 11, wherein the ORing is controlled by an output of an AND gate, wherein a first input of the AND gate is connected to a fault control logic line, and wherein a second input of the AND gate is operated by an output of the comparator.

16. The redundant power supply regulator of claim 15, wherein the fault control logic line is operated by a phase controller.

17. The redundant power supply regulator of claim 11, wherein using the transition control signal to prevent the comparator from turning off the ORing comprises allowing discharge of an output capacitance independent of load conditions.

18. The redundant power supply regulator of claim 11, wherein the transition control signal includes a delay allowing the redundant power supply regulator to return to normal operation.

19. The redundant power supply regulator of claim 11, wherein the transition control signal is received from one selected from a group consisting of a main controller and a phase controller.

20. The redundant power supply regulator of claim 11, wherein the ORing is one selected from a group consisting of a field-effect transistor and a bipolar switch.

* * * * *